United States Patent [19]

Darling et al.

[11] 4,294,199
[45] Oct. 13, 1981

[54] STEAM GENERATING MAGNETOHYDRODYNAMIC DIFFUSER

[75] Inventors: Scott L. Darling, Tariffville; Carl R. Bozzuto, Enfield, both of Conn.

[73] Assignee: Combustion Engineering, Inc., Windsor, Conn.

[21] Appl. No.: 88,731

[22] Filed: Oct. 26, 1979

[51] Int. Cl.³ .............................................. F22B 21/30
[52] U.S. Cl. ................................. 122/276; 122/248; 122/249; 165/147
[58] Field of Search ...................... 165/146, 147; 122/9, 122/19, 235 A, 235 C, 235 D, 235 J, 235 K, 246, 249, 271, 276, 304, 324, 331

[56] References Cited

U.S. PATENT DOCUMENTS

| | | | |
|---|---|---|---|
| 2,158,735 | 5/1939 | Vigneault | 122/248 |
| 2,228,590 | 1/1941 | Badenhansen | 122/347 |
| 2,445,115 | 7/1948 | Hanrahan | 165/147 |
| 3,051,146 | 8/1962 | Clarkson et al. | 122/249 |
| 3,321,002 | 5/1967 | Winkler | 122/248 |
| 3,333,123 | 7/1967 | Baumann | 165/147 |
| 3,970,048 | 7/1976 | Finger et al. | 122/276 |

*Primary Examiner*—Henry C. Yuen
*Attorney, Agent, or Firm*—William W. Habelt

[57] ABSTRACT

A steam generating diffuser comprising a plurality of heat exchange tubes arranged to form a horizontally disposed, longitudinally elongated open-ended divergent duct. A refractory lining is laid up around the inner surface of the divergent duct so as to protect the heat exchange tubes. The inlet of each heat exchange tube is connected to a lower water distribution header disposed beneath the duct and the outlet of each heat exchange tube is connected to an upper steam and water distribution header disposed above the duct. Each tube provides a fluid flow path between the lower and upper headers which is continuously upwardly directed.

1 Claim, 4 Drawing Figures

FIG. I

STEAM GENERATING MAGNETOHYDRODYNAMIC DIFFUSER

BACKGROUND OF THE INVENTION

The present invention relates to magnetohydrodynamic power generation, and more particularly, to a unique diffuser design allowing steam generation within its walls.

In a magnetohydrodynamic (MHD) power generator, a diffuser is typically disposed downstream of the MHD generation channel to slow the high velocity gases exhausted therefrom prior to their submission to downstream generating equipment. The diffuser comprises a divergent open-ended duct, the cross-sectional area of the duct increasing continuously from the gas inlet end to the gas outlet end thereof. By passing high velocity gases through a diffuser, the gases are slowed so as to permit pressure recovery in accordance with the well-known Bernoulli's equation and temperature recovery in accordance with the well-known perfect gas law. In order to assure optimum pressure recovery, small half angles of divergence in the range of one to three degrees must be maintained when designing the diffuser.

Because of the high temperature of the gases passing from the MHD generation channel to the diffuser, approximately 3700 F., the diffuser walls must be constructed of refractory protected water-cooled tubes. The fact that the walls of the diffuser diverge at such small angles creates cooling problems. For instance, if the waterwall tubes containing the cooling water are oriented along the length of the divergent channel, boiling would have to be avoided because steam blanketing would occur in those tubes which are directed downhill. As a consequence of the steam blanketing, the tubes would overheat and fail. Thus, such a system would require large amounts of sub-cooled water in order to insure that steaming did not occur within the water-cooled tubes.

SUMMARY OF THE INVENTION

It is an object of the present invention to provide a MHD diffuser uniquely designed to permit steam within its water-cooled walls.

The steam generating MHD diffuser of the present invention comprises a plurality of heat exchange tubes arranged to form a horizontally orientated longitudinally elongated open-ended divergent duct. A horizontally orientated, longitudinally elongated lower water distribution header is positioned beneath the duct formed by the heat exchange tubes and connected to the inlet of each of the heat exchange tubes. Similarly, a horizontally orientated, longitudinally elongated upper steam and water collection header is positioned above the duct formed by the heat exchange tubes and connected to the outlet of each of the heat exchange tubes.

Thus, a fluid flow path is provided between the lower water distribution header and the upper steam and water collection header through which water is circulated to cool the tubes forming the walls of the diffuser. Water is circulated through the walls of the diffuser at such a rate that a steam and water mixture is generated therein. A refractory lining is laid up around the inner surface of the divergent duct so as to protect the heat exchange tubes forming the diffuser from the hot gases passing therethrough.

In accordance with the invention, each tube provides a fluid flow path between the lower water distribution header and the upper steam and water collection header which is at all locations therebetween upwardly directed. In this manner, steam blanketing is precluded. The steam formed within the water-cooled tubes will continuously move upward because the flow path is uphill at all times. No portion of the flow path is directed downhill.

BRIEF DESCRIPTION OF THE PREFERRED EMBODIMENT

Figure 1:
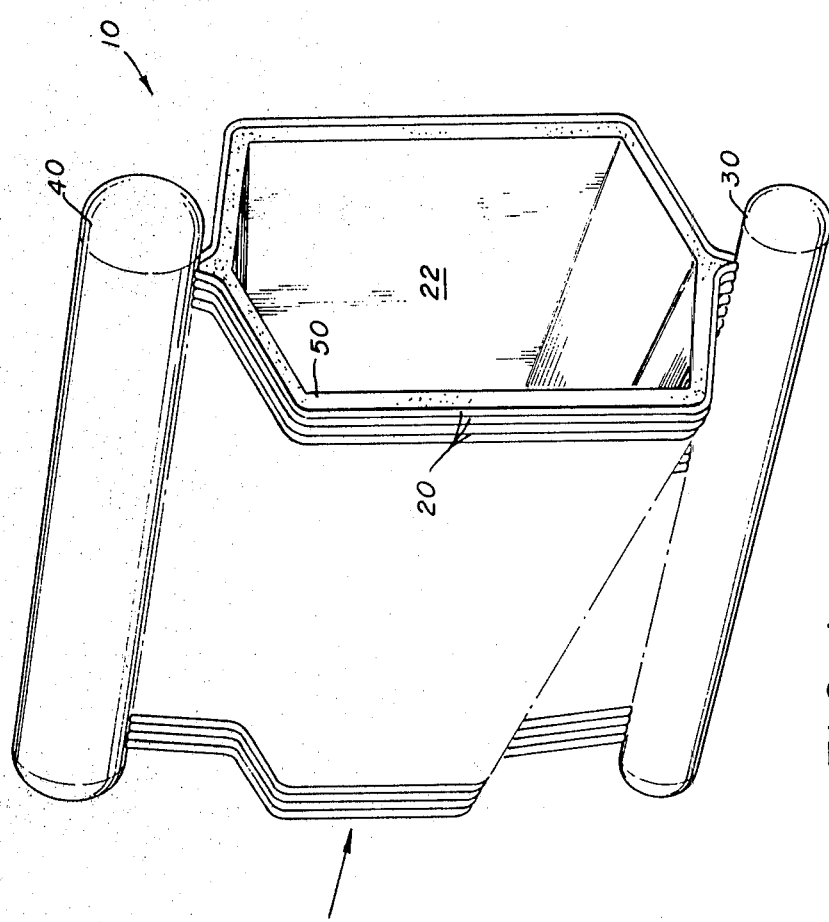
FIG. 1 is a perspective view of a diffuser constructed in accordance with the present invention.
Figure 2:
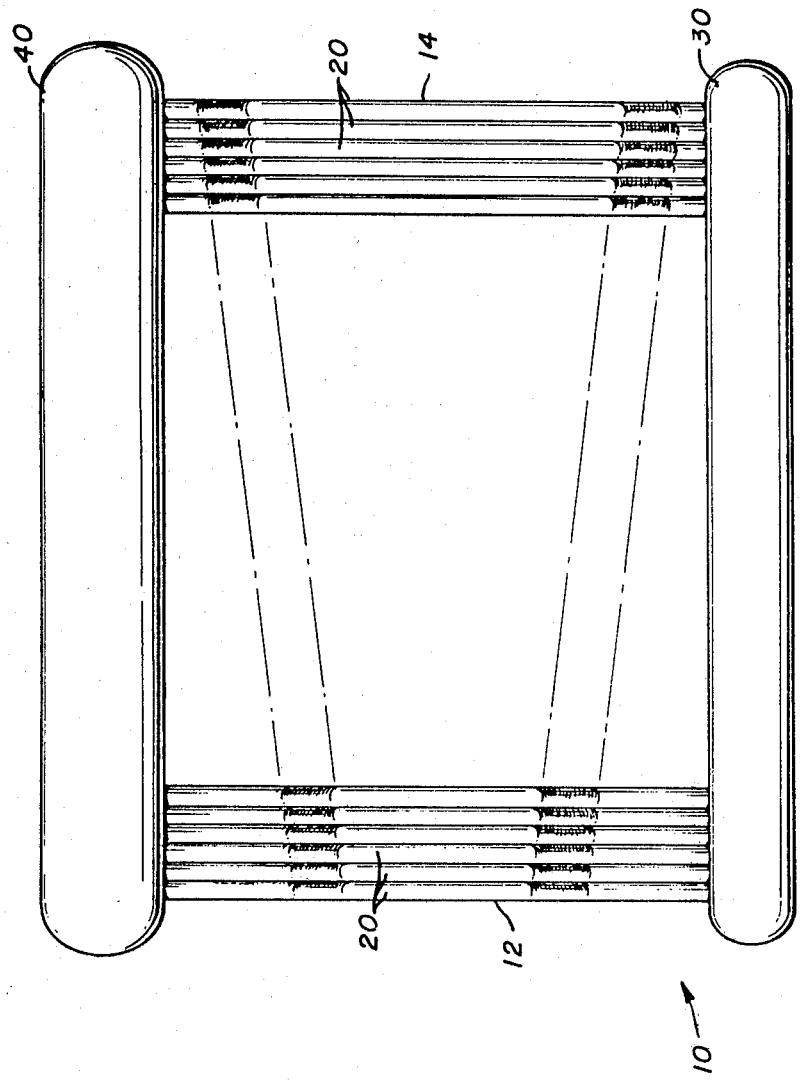
FIG. 2 is a side elevational view of the steam generating diffuser of FIG. 1.
Figure 3:
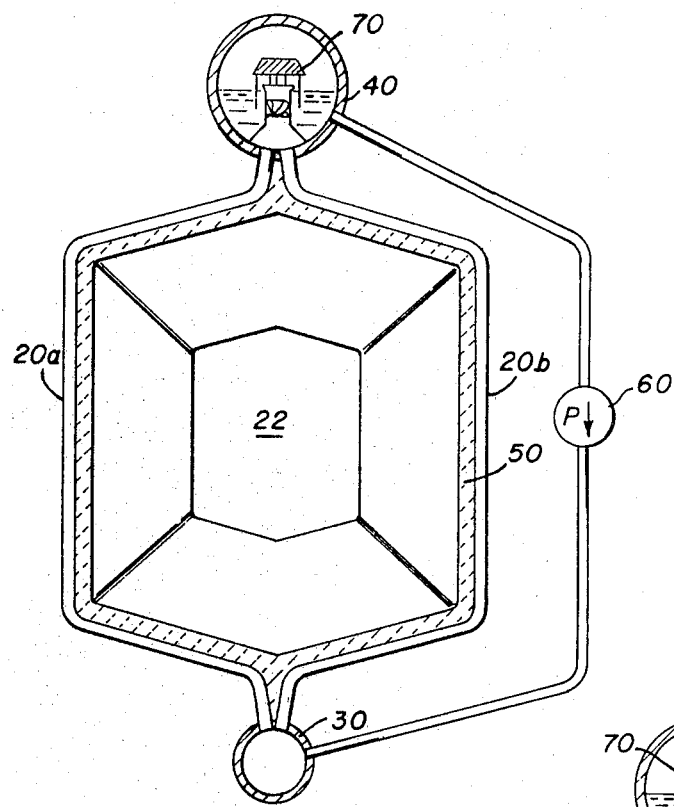
FIG. 3 is a cross-sectional view of the steam generating diffuser of FIG. 1 looking down the length of the diffuser from the gas outlet end thereof.

As shown in FIGS. 2 and 3, the steam generating diffuser of the present preferred embodiment comprises a plurality of heat exchange tubes 10 arranged to form a horizontally orientated longitudinally elongated divergent open-ended duct having a gas path 22 axially therethrough. The cross-sectional area of the gas flow path 22 of the steam generating diffuser 10 increases continuously from the gas inlet end 12 to the gas outlet end 14 thereof. A refractory lining 50 is laid up around the inner surface of the divergent duct so as to protect the heat exchange tubes forming the divergent duct from seed or slag condensation and to give the gas flow path 22 through the diffuser its final shape.

A horizontally orientated, longitudinally elongated lower water distribution header 30 is disposed beneath the diffuser duct and a horizontally orientated, longitudinally elongated upper steam and water collection header 40 is disposed above the diffuser duct. The inlet of each of the plurality of heat exchange tubes 20 is connected to the lower water distribution header 30 to receive a supply of water therefrom and the outlet end of each of the plurality of heat exchange tubes 20 is connected to the upper steam and water collection header 40 for directing the steam water mixture formed in the heat exchange tubes 20 into the collection header 40. Thus, each of the heat exchange tubes 20 provides a flow path from the lower water distribution header 30 to the upper steam and water collection header 40 through which water is circulated to cool the heat exchange tubes and generate steam. Means, 60, for circulating water from the lower water distribution header through the heat exchange tubes forming the diffuser duct to the upper steam water collection header cause water to be circulated from distribution header 30 at a rate such that a portion of the water is vaporized into steam when passing through the heat exchange tubes 20.

In accordance with the invention, each of the heat exchange tubes provides a flow path between the lower water distribution header and the upper steam and water collection header 40 which is at all locations therebetween upwardly directed. That is, at all times the water and steam mixture passing through the heat exchange tubes 20 is flowing uphill from the water distribution header 30 to the steam and water collection header 40. Because the mixture is always flowing uphill, steam blanketing within the heat exchange tubes 20 is precluded.

In the preferred embodiment, as best illustrated in FIG. 3, the steam generating diffuser duct comprises a plurality of heat exchange tube pairs 20a and 20b disposed side by side in vertical planes to form the open-ended divergent duct. The tubes 20a and 20b of each pair extend vertically upward from the lower water distribution header 30, thence diverge by extending outwardly and upwardly at an acute angle with the horizontal to form the floor of the diffuser. Each of the tubes 20a and 20b thence extends substantially vertically upward to form the side walls of the diffuser duct and thence converge by extending upwardly and inwardly at an acute angle with the horizontal to form the roof of the diffuser duct. Each of the heat exchange tubes 20a and 20b thence extend directly vertically upward into the upper steam and water collection header 40. A refractory lining 50 is laid up around the interior of diffuser duct to protect the surface of the heat exchange tubes 20a and 20b from the gases passing through the gas path 22 of the diffuser duct. The refractory lining 50 may comprise any of the well-known refractory coatings either in brick or spray-on form.

Figure 4:
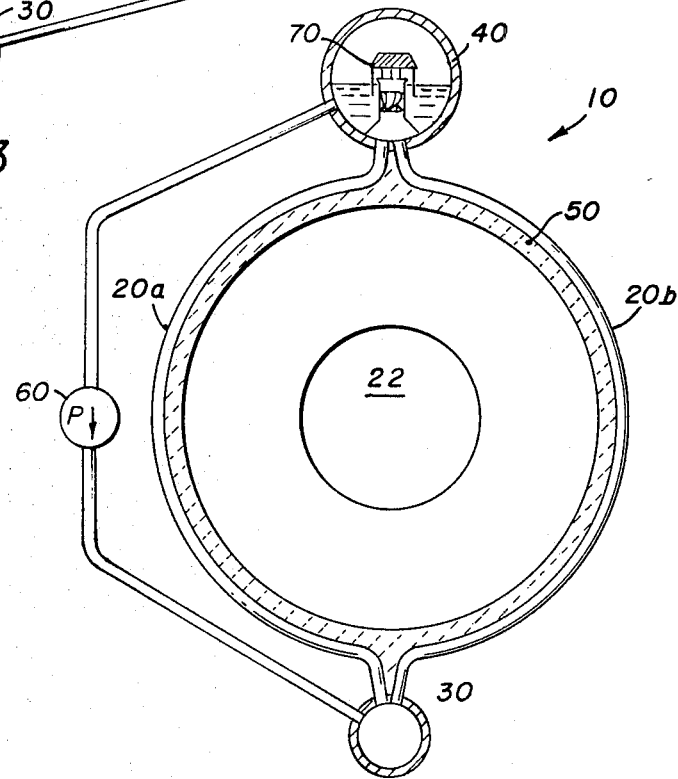
FIG. 4 is a cross-sectional view of an alternate embodiment of the steam generating diffuser of the present invention again looking down the length of the diffuser from the gas outlet end thereof.

An alternate embodiment of the steam generating diffuser 10 of the present invention is shown in FIG. 4. Therein, the heat exchange tubes 20a and 20b extend vertically upward from the lower water distribution header 30 and thence diverge outwardly in the form of half circles. At the top of the diffuser duct the half circles converge and tubes 20a and 20b extend directly upward into the upper steam and water collection header 40. In this manner, a diffuser duch having a generally circular cross-section is formed. Again, a refractory lining 50 is laid up around the interior of the diffuser duct to protect heat exchange tubes 20a and 20b from the gases passing therethrough.

In operation, water from circulating means, such as a boiler circulating pump, enters the lower water distribution header 30 wherein it is distributed to a plurality of heat exchange tubes 20 which may be orificed to provide uniform flow therethrough. Steam is generated within the heat exchange tubes 20 from heat lost from the hot gases as the hot gases pass through the flow path 22 of the diffuser duct. The steam-water mixture generated within the heat exchange tubes 20 is collected in the upper steam and water collection header 40. From the upper steam and water collection header 40 the steam-water mixture is directed to a steam drum, not shown, wherein the steam is separated from the water. In an alternate embodiment of the present invention, the upper steam and water collection header 40 also serves as a steam drum, having internal means 70 for separating steam from the water collecting therein.

We claim:

1. A steam generating diffuser comprising:

a. a horizontally orientated, longitudinally elongated upper collection header;

b. a horizontally orientated, longitudinally elongated lower distribution header positioned beneath said upper header;

c. a plurality of heat exchange tube pairs disposed side by side in vertical planes to form an open-ended divergent duct disposed about a vertical axis, the tubes of each pair extending vertically upward from said lower header, thence diverging by extending outwardly and upwardly at an acute angle with the horizontal to form the floor of said duct, thence extending substantially vertically upward to form the side walls of said duct, thence converging by extending upwardly and inwardly at an acute angle with the horizontal to form the roof of said duct, and thence extending substantially vertically upward to said upper header, each tube thereby providing a continuously upwardly directed fluid flowpath between said lower and said upper headers;

d. a refractory lining laid up around the inner surface of said divergent duct so as to protect the heat exchange tubes forming said divergent duct from hot gases passing therethrough;

e. means for circulating water from said lower header through the heat exchange tubes forming said duct to said upper header whereby a portion of the water is vaporized to steam when passing through said heat exchange tubes; and f. said upper collection header further comprises a water and steam drum having internal means for separating the steam from the water collecting therein.

* * * * *